United States Patent [19]
Hardin

[11] Patent Number: 6,053,239
[45] Date of Patent: Apr. 25, 2000

[54] GEOTHERMAL ENERGY MEANS AND PROCEDURE

[75] Inventor: James R. Hardin, Indianapolis, Ind.

[73] Assignee: Hardin Geotechnologies, LLC., Indianapolis, Ind.

[21] Appl. No.: 09/148,290

[22] Filed: Sep. 4, 1998

[51] Int. Cl.[7] .................................................. F24D 11/00
[52] U.S. Cl. ...................................... 165/45; 62/DIG. 22
[58] Field of Search ............................ 165/45; 62/238.6, 62/260, 238.7, DIG. 22

[56] References Cited

U.S. PATENT DOCUMENTS

| | | | |
|---|---|---|---|
| 3,550,677 | 12/1970 | Knowles | 165/108 X |
| 4,421,158 | 12/1983 | Kirchner | 165/278 |
| 4,782,888 | 11/1988 | Bardenheier | 165/11.1 X |
| 5,727,621 | 3/1998 | Hardin | 165/45 |

*Primary Examiner*—Allen Flanigan
*Attorney, Agent, or Firm*—Robert A. Spray, Patent Attorney

[57] ABSTRACT

As a supplement to this inventor's prior U.S. Pat. No. 5,727,621, this invention provides, in the combination with that patent, the additional concept of a terminal receiver means. It provides appropriate cleansing and testing features for the water which has served its geothermal purpose.

The thermally-used geoexchange water is routed back to the primary water line at an inlet thereinto which is close to the primary water line's outlet from which that water had been drawn, providing a great savings of a lengthy "return" line, entered upstream of the distant primary water-treatment means as contemplated in that prior patent as being the presumably necessary way of certainty of elimination of any contamination entered to water by the geothermal usage.

2 Claims, 1 Drawing Sheet

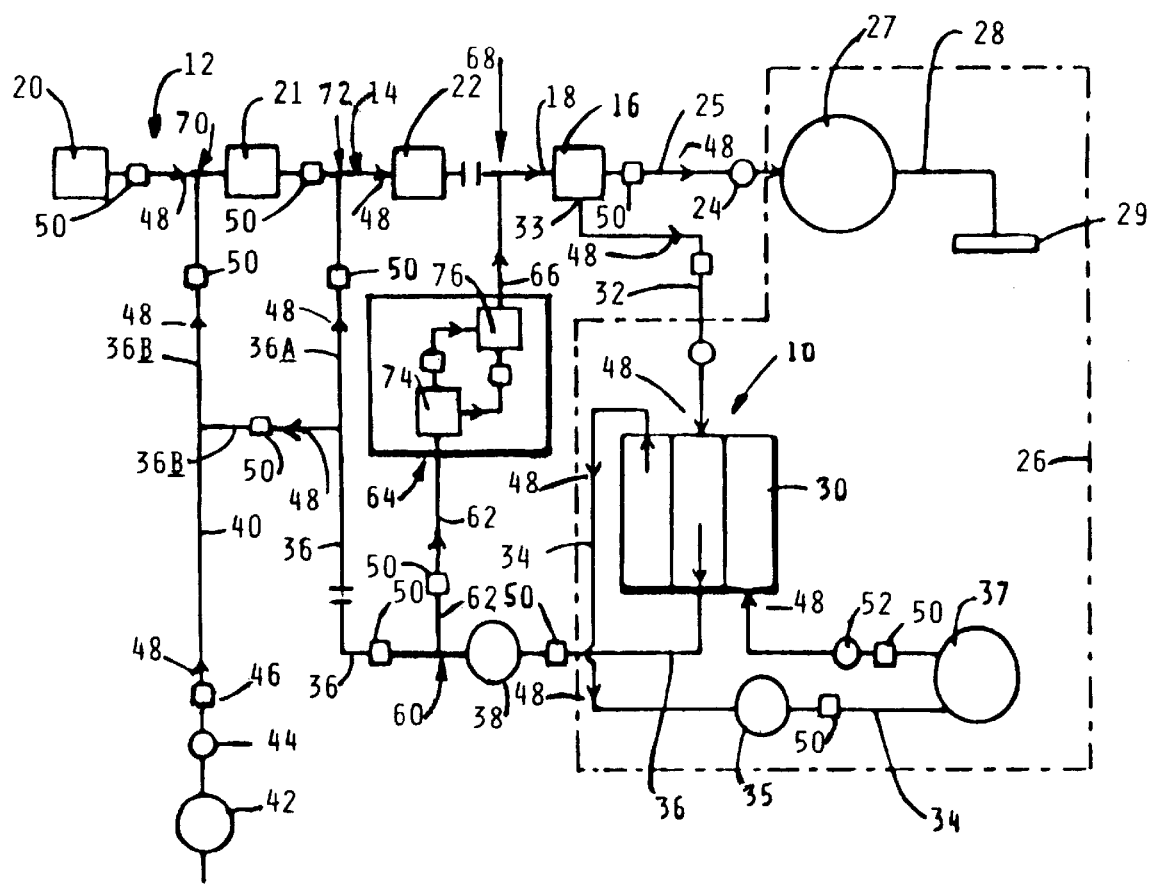

GEOTHERMAL ENERGY MEANS AND PROCEDURE

I. FIELD AND USEFULNESS OF THE INVENTION, BRIEFLY

The present invention relates to geothermal energy installations.

More particularly, the present invention is a supplement to the invention of the prior U.S. Pat. No. 5,727,621 (Mar. 17, 1998) of the present Inventor; and, more particularly, the concepts of the present invention add to the state of the geothermal art as set forth and referenced in that prior patent.

Even more particularly, the concepts of the present invention provide great economy over geoexchange factors of geothermal installations of that prior patent, within but building on the concepts of that prior patent.

That is, the present invention diverges from costly but basic features of the illustrative embodiment shown and described in that patent, in a manner and by concepts which achieve a great savings of avoiding an expensive "return" conduit system required as an inherent factor of geothermal installations as specified in the illustrative embodiment of that prior patent.

II. THE PARTICULAR PROBLEM OF U.S. Pat. No. 5,727,621 AVOIDED AND SOLVED BY THE PRESENT INVENTION

The cited prior patent itself was a valuable step in the geothermal installation art, in that it provided a possibility of huge cost-savings by the step of utilizing the thermal energy of the geoexchange water of the geothermal use in a particular "closed" system which used only the thermal energy of the water of the primary potable water line rather than using that water itself, i.e., rather than passing the geothermally-used water to waste.

A basic factor of that prior invention was the step of returning that geoexchange or thermally-used water to a remote inlet upstream of the primary line's filtering/cleansing equipment, a long journey of that only-thermally-used water; and the long journey of that return-water step of course required a full-length return line, considered to be an inherent step, reasonably thought needed to assure against the hazard and danger of contaminated geoexchange water if introduced back into the primary water line of incoming water downstream of the incoming water's treatment facilities.

After all, the water-treatment facilities themselves were often quite remote from the location of the geothermal field of use; and thus, it apparently seemed inevitable that the geothermal return line be of such a long length that its water may be introduced upstream of the treatment facilities even though that required a very long length of return line.

The apparent necessity of a miles-long return line was a great expense factor, even in new installations in which the return line could be laid as an expense of the trench labor in a shared-cost justification with the needed basic primary line, for the return line conduit itself is expensive.

Even more expense would be occasioned in adding a geothermal installation to existing installations, for the laying of the lengthy return line would not be a shared cost of a primary line which had already been installed.

Accordingly, even though itself a valuable invention of a particular "closed" system by which water purity was assured in spite of hazardous contamination in the geothermal use, the cited prior patent presented cost which the prior patent shows was assumed to be an incident of geothermal installations; and the cited patent was the closest one known to the present inventor as to a desirable "closed system" nature of a "non-consumable" water usage.

Thus, as an invention of the "last step which wins" sort, the present invention maintains the water-purity nature of the thermally-used water of the geoexchange usage, avoiding much of the cost of laying and/or conduit cost, by now the relatively simple and relatively inexpensive step of providing a terminal receiver means, such as a receiving tank and appropriate testing and treatment facilities, the terminal receiver means being located adjacent the situs of the geothermal equipment or field of use, for the thermally-used water of the geoexchange equipment, prior to entering back that thermally-used water into the potable water system, yet using the primary or potable water line's outlet at the termination as the source of the geoexchange water.

III. PRIOR ART CAPABILITY AND MOTIVATIONS, AS HELPING TO SHOW PATENTABILITY HERE

Even in hindsight consideration of the present invention to determine its inventive and novel nature, it is not only conceded but emphasized that the prior art had many details usable in this invention, but only if the prior art had had the guidance of the present invention, details of both capability and motivation.

That is, it is emphasized that the prior art had/or knew several particulars which individually and accumulatively show the non-obviousness of this combination invention. E.g., (a) Although this Inventor's prior U.S. Pat. No. 5,727,621 was granted only as recently as Mar. 17, 1998, the need and desire to minimize costs has long been a factor of concern to probably most or all workers in this field; and this seems especially significant in view of the huge costs involved in the geothermal installations;

(b) The matter of there having been only a relatively short time between a prior art patent and the concept of a new invention which improves upon a detail of that patent is logically realized by the U.S. Patent Office and by the Courts to not necessarily negate the improvement invention as inventive; and the applicability of this realization seems quite logical expecially here where all the components, when considered separately from the combination are not only in existance but are quite present;

(c) The matter of time is not the criteria for patentability; the criteria for patentability is non-obviousness, which is here shown in various aspects;

(d) The nature of an invention as being a "novel combination", in spite of existance of details separately, is especially significant here where the novelty is of the plurality of concepts, i.e., the addition of a new water-treatment facility even though there are already water-treatment facilities in the line, the addition of the concept of the new water-treatment facility being closely adjacent to the geothermal installation, the addition of a concept of a new and short return line, avoiding the cost and expense of a lengthy return line going all the way upstream to be upstream of existing water-treatment facilities; and the addition of the concept of routing the return line adjacent the geothermal inlet and geothermal installation;

(e) The addition of the concept of routing the return line adjacent the geothermal inlet and geothermal installation, in contrast to routing of the return line upstream of the primary water-treatment facility in the line, which is what this Inventor's prior patent had taught, a "teaching away" from the present invention's combination;

(f) The functions of a terminal receiver means, and conduits leading to and from the receiver means, are already fulfilled in the prior art, substantially as effectively but at much more expense;

(g) The persons who are knowledgeable in the overall field of geothermal installations include persons of various backgrounds, professional people, governmental administrators, laborers, etc., many of whom have no doubt become aware of this Inventor's prior U.S. Pat. No. 5,727,621, by competitive efforts, trade journals, association meetings, etc.;

(h) The matter of particular cost-factors, in a detailed form which would surely convey the realization of the huge costs of return-line conduit and installation costs, is reasonably such that the huge and realized amount of such charges would be a special incentive;

(i) The present invention is considered to be one which has been a "building on" of that patent, this having been by a major change, by addition of a terminal receiver means and a major change in the hydraulic nature of the geothermal equipment's return line;

(j) The immense length of the incoming water lines for potable water, and the remote location of the existing facilities for filtering/cleansing, seem likely to have been very-present factors of knowledge to all persons associated with the field of geothermal installations, that the present invention would have been obvious to others, but only if they had had the inventive creativity;

(k) Similarly the possibility of simply installing additional filtering/cleansing equipment at a terminal receiver means seems surely to have suggested this invention, but only to a person who had the creative insight, especially since the existing (although remote) treatment facilities would probably be considered as themselves more than adequate;

(l) Ever since the said patent was granted, and long before, the field of geothermal installations has been increasing, both as to individual sites and areas or "fields" of use, encouraged by not only factors of cost but of consideration of environmental betterment, governmental encouragement, etc.

The prior art capability and motivations seem generally also to be as those stated in Section IV of this Inventor's patent, e.g.

(m) Hydraulic circuitry, and specifically water conduit systems and networks, have long been in worldwide use;

(n) The nature of ground water deposits of various types, their practically inexhaustable quantity, their nearly uniform mean temperatures, etc., have been long known;

(o) The installation of water conduit systems has been already done in many locations;

(p) The geothermal effect of water as caused to pass through heat exchanger components of various installations has long been used;

(q) The ease of tooling for the present invention has surely given manufacturers ample incentive to have made modifications for commercial competitiveness in a competitive industry, if the concepts had been obvious;

(r) The prior art has always had sufficient skill to make many types of water conduit systems and features, more than ample skill to have achieved the present invention, but only if the concepts and their combinations had been conceived;

(s) Substantially all of the operational characteristics and advantages of details of the present invention, when considered separately from one another and when considered separately from the present invention's details and accomplishment of the details, are within the skill of persons of various arts, but only when considered away from the integrated and novel combination of concepts which by their cooperative combination achieve this advantageous invention;

(t) The details of the present invention, when considered solely from the standpoint of construction, are exceedingly simple, basically water conduit and related hardware available for various hydraulic installations; and the matter of simplicity of construction has long been recognized as indicative of inventive creativity;

(u) Similarly, and a long-recognized indication of inventiveness of a novel combination, is the realistic principle that a person of ordinary skill in the art, as illustrated with respect to the claimed combination as differing in the stated respects from the prior art both as to construction and concept, is presumed to be one who thinks along the line of conventional wisdom in the art and is not one who undertakes to innovate; and (v) The predictable benefits from a novel geothermal installation and procedure having the features of this invention would seem sufficiently high that others would have been working on this type of installation, but only if the concepts which it presents had been conceived.

Accordingly, although the prior art has had capability and motivation, amply sufficient to presumably give incentive to the development of an installation and procedure according to the present invention, the fact remains that this invention awaited the creativity and inventive discovery of the present Inventor. In spite of ample motivation and capability shown by the many illustrations herein, the prior art did not suggest this invention.

IV. PRIOR ART AS PARTICULAR INSTANCES OF FAILURE TO PROVIDE THIS NOVEL INSTALLATION AND PROCEDURE

In view of the general economic advantages, ecological advantages, etc., of the present invention as an improved embodiment of the more basic invention of the U.S. Pat. No. 5,727,621, it may be difficult to realize that the prior art has not conceived of the combination purpose and achievement of the present invention, even though water conduits and systems of conduits are relatively common and widespread installations, and the water supply industry, like other industries, can use improvements in various aspects. Further, persons knowledgeable with respect to water field circuitry surely include an uncountable multitude of persons, at least of sufficient experience, skill, etc., that the present invention, even earlier than the date of that U.S. Pat. No. 5,727,621, would have been desired and attempted long ago, but only if its factors and combination-nature had been obvious.

The very nature of that prior patent, and the present invention's relation to that prior patent, itself shows the inventive nature of the improvement here made; for it might be considered that the present invention is in the nature of a change of the "return" line, as merely a change of a construction detail instead of a change of concept which achieves huge cost savings, even though the change in construction may look easy when viewed by hindsight.

Other considerations, as herein mentioned, when realistically evaluated show the inventive nature of the present invention, a change in concept which the prior patent and other prior art did not achieve.

V. SUMMARY OF THE PRIOR ART'S LACK OF SUGGESTIONS OF THE CONCEPTS OF THE INVENTION'S COMBINATION

And the existence of such prior art knowledge and related ideas embodying such various features is not only conceded, it is emphasized; for as to the novelty here of the combination, of the invention as considered as a whole, a contrast to the prior art helps also to remind of needed improvement, and the advantages and the inventive significance of the present concepts. Thus, as shown herein as a contrast to all the prior art, the inventive significance of the present concepts as a combination is emphasized, and the nature of the concepts and their results can perhaps be easier seen as an invention.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it is determinatively significant that none of the prior art shows the novel and advantageous concepts in combination, which provides the merits of this invention, even though certain details are shown separately from this accomplishment as a combination.

And the prior art's lack of an invention of an economical return line achieving the economy and ecology characteristics and other advantages of the present invention, which are goals only approached by the prior art, must be recognized as being a long-felt need now fulfilled.

Accordingly, the various concepts and components are conceded and emphasized to have been widely known in the prior art as to various installations; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

VI. BRIEF DESCRIPTION OF THE DRAWING

The above description of the novel and advantageous invention is of somewhat introductory and generalized form. More particular details, concepts, and features are set forth in the following and more detailed description of an illustrative embodiment, taken in conjunction with the accompanying Drawing, which is of quite schematic and flow diagrammatic nature for showing the inventive concepts.

(In the Drawing, the present invention is shown as superimposed upon prior art background upon which the present invention builds, and of the prior art it is particularly to be noted that details of the U.S. Pat. No. 5,727,621, which are here economically avoided, is that portion of the Drawing which extends from point 60 downstream through conduits 36, 36A, and 36B until point 70 and 72; and the present invention is the circuit from point 60 of conduit 36 downstream through conduit 62, terminal receiver means 64, and circuit 66 up to point 68.)

VII. DETAILED DESCRIPTION OF ILLUSTRATIVE EMBODIMENT

As shown in the Drawings, the inventive concepts provide and achieve a novel feature which is advantageous in use with a geothermal energy means 10 of this Inventor's prior U.S. Pat. No. 5,727,621; and the novel features of the present invention may be best understood by first giving here a description of the geothermal energy means usage in that patent as background for the present Invention's utilization of that prior patent as the state of the art in these particulars upon which the present invention builds.

The description of the geothermal energy means 10 is here set forth in its use, i.e., for association with a primary water-supply means 12. The primary water supply means 12 is shown as including conduit means 14; and by that water-conduit means 14 potable water is supplied to a field of premises 16 which are to be supplied as participants of the potable water from the water-supply means 12.

The water for making up the potable water in the primary water-conduit means 14 is supplied to the use-field 16 of customers' premises by a primary input line 18 which operatively leads from whatever is to be used as the associated ground water source 20 to supply potable water to the premises of the field 16.

The water source 20 of course depends upon the site and availability, such as underground well, a pond or stream, etc.

Also as typical of prior art supply, there is provided one or more water-treatment means here shown as a preliminary cleansing or filtering means 21 and a final treatment 22, they being operatively in the primary water-conduit means 14.

Also as per the prior art there is a meter means 24, which measures the volume of water being supplied in the particular customer's line 25 from the potable water supply delivered from the field 16 to a user's premises 26.

The line 25 is shown as leading to a potable water usage indicated as element 27 by which potable water after use is led by line 28 to waste indicator 29.

The waste indicator 29 is meant to designate whatever one or more are the loss passages from the particular user's discharge lines 28 which discharge dirty or wasted water, evaporation of lawn sprinkling, etc.

Also as a part of prior art water supply, as here built upon, many user's field 16 components operatively includes a heat exchanger means 30, for whatever happens to be one or more uses of water which utilize a heat exchanger means.

It is with respect to the heat exchanger means 30 and its use in this Inventor's prior U.S. Pat. No. 5,727,621, that the concepts of that patent improve the state of the art.

More particularly, the geothermal energy means 10 associated with the heat exchanger means 30 in that patent comprised the improvement of a secondary water-conduit means 32 which leads from line 18 (of 14) or field 16, at the outlet 33, which outlet 33 is quite remote downstream from the treatment stages 21 and 22 and which is connected not to waste 29 as in prior art systems but instead to the field 16 of potable water upstream of its meter means 24, for a re-circulating concept which avoids most of the cost of potable water which is supplied to the premises as drinkable, but not necessarily 80, in situations in which it is used only for its thermal energy value or purpose.

That is, the secondary water-conduit means 32 operatively passes through the heat exchanger means 30 of the user's premises 26 in heat transfer relation to the tertiary conduit 34, which represents the closed loop of the liquid which in the heat exchanger 30 is used to achieve a heat transfer relationship with the water coming to the heat exchanger 30 from line 32.

(That tertiary conduit 34's water, after leaving the heat exchanger means 30, will then pass through the one or more customer usages of thermally-affected water in line 34 as is indicated in the Drawings by designation 37 as pumped by pump 35.)

The primary water flowing through secondary circuit line 32 and the heat exchanger means 30 is shown as traveling by quaternary line 36 through a pump 38 and is shown connected as a "return" line to the primary water-conduit means 14, and in that patent by whatever long length of conduit 36A or 36B it takes to tap into the primary water line 14 upstream of the primary water-treatment means 21 and/or 22.

Further, in that patent, the secondary water-conduit means there 32/36 is provided to have at least two optionally usable branch conduit means 36A and 36B, a first one 36A of which branch conduit means is connected to the primary water-conduit means 14 operatively between the said first 22 and second 21 treatment means, and another of the branch conduit means 36B is operatively connected to the primary water-conduit means 14 upstream of the second treatment means 21, for assuring even more positiveness of filtering/cleaning.

Additional circuitry may of course be provided. Thus, e.g., an additional input circuit 40 is shown as providing additional water, by attachment to the downstream portion of line 36B to the water supply conduit means 14; and the circuit 40 is shown with a pump 42, a meter 44 and a valve 46.

The direction of water flow throughout is indicated by arrowheads 48, the piping function being shown diagrammatically.

Other valves 50 including check valves are illustrated diagrammatically in the various circuit lines as components 50.

Meters may be used where desirable, such as at 52 in tertiary circuit 34.

The Drawing also schematically shows how the present invention builds upon the prior invention of this Inventor's prior U.S. Pat. No. 5,727,621; and a comparison of the Drawings of the present invention with the Drawings of that prior patent shows the concepts of the present invention as now detailed.

That is, instead of the lengthy stretch of the "return line" 36 after passing (leftwardly) from pump 38 to eventually get to the optional return lines 36A or 36B (as in the prior patent), the return line 62 of a secondary conduit for return line 66 emerges from outlet 60 adjacent pump 38, and enters a terminal receiver means 64, which is an installation relatively closely adjacent the geothermal means 30; and from the terminal receiver means 64 a return line 66 of the secondary conduit taps into the primary potable water line 18 (of 14), at junction point 68 also relatively close to the geothermal equipment 30, a place on the primary water line 14 much closer than the junction point 70 or 72 as contemplated in the disclosed embodiment in the prior patent, the inlet 68 into the primary potable water line 18 (of 14) being remotely downstream from the water-treatment means 21 and 22 and their inlet points 70 and 72.

Schematically indicated as components within terminal receiver means 64 are a receiver tank 74 and a treatment tank 76; and these are appropriately usable for cleansing/testing of this water in line 66, sufficiently to provide that the water from return line 66 to the primary potable water line 14 is appropriately as good as the line 14 water.

VIII. SUMMARY OF COMPONENTS AND OPERATIONAL DETAILS, AND THEIR ADVANTAGES

The present invention as detailed herein has advantages in both concept and in component parts and features; for in contrast to other systems known to the inventor as to the prior art of reference, the invention provides advantageous features which should be considered, both as to their individual benefit, and to whatever may be considered to be also their synergistic benefit toward the invention as a whole. Such features include:

(a) Utilization of the prior art feature of obtaining water for the geothermal apparatus by tapping into the primary water line at a location close to the geothermal use;

(b) Utilization of the prior art feature of returning the thermally-used water from the geothermal apparatus to the primary water line;

(c) The provision of a terminal receiver means for removing whatever contamination might be caused by geothermal usage of water from the primary water line, and rendering such water substantially as free from contamination as the water in the primary water line upstream of its geothermal use;

(d) The provision of locating the terminal receiver means far downstream of the primary water-treatment means of the primary water line, thereby avoiding the expense of providing a lengthy return line for the thermally-used water to go upstream of any distant water-treatment means;

(e) The provision of conduit means from the geothermal apparatus to the terminal receiver means, and from the terminal receiver means to a close-by inlet for water treated by the terminal receiver means to go back to the primary water line;

(f) Utilization of the features of the inventor's prior patent U.S. Pat. No. 5,727,621, but overcoming an avoidable expense disadvantage thereof, an avoidance not foreseen nor suggested in that patent;

(g) Utilization of other concepts of the prior art but providing advantages thereover;

(h) Render more likely the return of the geothermally used water to be at about the same temperature as the water in the primary water line;

(i) Obtain the benefits of the shorter return line, considering factors of installation cost, assuredness of the entire length of the return conduit system being below freezing point, some lessening of easement problems; and (j) Maximizing benefits of geothermal technology.

The above is a summary of the various features which co-operate to provide the possibility of huge economic advantages by using the basic concept of prior U.S. Pat. No. 5,727,621, by use of the present concepts of routing the thermally-used water into and through a terminal receiver apparatus and back to the primary water line at an adjacent location, avoiding the cost of a lengthy return line as used in the embodiment set forth in that prior U.S. Pat. No. 5,727,621.

IX. CONCLUSION AS TO INVENTIVE COMBINATION

It is thus seen that a water system for a geothermal installation provides an advantageous terminal receiver apparatus adjacent to the region of usage of the geothermal equipment, with appropriate conduit means to route the water, which has been cleansed by the terminal receiver back to the primary water line, avoiding a lengthy and costly return line for thermally-used water, a desirable and usefully advantageous installation and procedure, yielding advantages which are and provide special and particular advantages when used as herein set forth.

In summary as to the nature of the overall and advantageous concepts, their novelty and inventive nature is shown by novel features of concept and construction shown here in advantageous combination and by the novel concepts hereof not only being different from all the prior art known, even though other water systems have been known and used for scores of years, but because the achievement is not what is or has been suggested to those of ordinary skill in the art, especially realistically considering this as a novel combination comprising components which individually are similar in nature to what is well known to very many persons, surely including most of the many technicians and professionals of water-delivery systems and apparatus for a great number of years, throughout the entire world. No prior art component or element has even suggested the modifications of any other prior art to achieve the particulars of the novel concepts of the overall combination here achieved, with the special advantages which the overall combination system provides; and this lack of suggestion by any prior art has been in spite of the long worldwide use of water delivery systems, public and privately operated, by building upon the invention shown in prior U.S. Pat. No. 5,727,621.

The differences of concept and construction as specified herein yield advantages over the prior art; and the lack of this invention by the prior art, as a prior art combination, has been in spite of this invention's apparent simplicity of the construction once the concepts have been conceived, in spite of the advantages it would have given, and in spite of the availability of all the materials, to all persons of the entire world, and the invention's non-technical and openly-visible nature.

Accordingly, it will thus be seen from the foregoing description of the invention according to this illustrative embodiment, considered with the accompanying drawings, that the present invention provides new and useful concepts of a novel and advantageous system and procedure, possessing and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

Thus, words such as "close", "adjacent", "remote", and the like are to be considered in the broad sense of showing the contrast between the return line feature of prior U.S. Pat. No. 5,727,621, and the much shorter return line feature which incorporates a terminal receiver adjacent the location of water taken from the primary water line for geothermal use and cleansed water put back into the primary water line.

Similarly, to be considered in their broad sense both as apparatus and procedure are words such as "contamination", "treatment", "geothermal", "removing", and the like.

What is claimed is:

1. For a water-supply system having water brought in from an available water-supply source by a primary water line, the water possibly having contamination from the water-supply source and/or from the primary water line, the primary water line having a primary water-treatment means for removing contamination from the water of the water-supply source and/or from the primary water line, the primary water line also having a geothermal energy means remotely downstream from said primary water-treatment means, the geothermal energy means using water from an outlet in the primary water line relatively close to the geothermal energy means, the geothermal energy means usage of the water possibly imparting contamination to the water, the improvement comprising the provision of the following in combination:

a terminal receiver means for removing contamination from the geothermal energy means usage of the water, the terminal receiver means being located remotely downstream from the primary water-treatment means of the primary water line, and relatively close to but downstream of the geothermal energy means, and secondary conduit means having a portion for carrying the water from the geothermal energy means to the terminal receiver means, and having a portion for carrying the water from the terminal receiver means to the primary water line at an inlet thereinto which is at a location therealong which is remotely downstream from the primary water-treatment means of the primary water line;

the terminal receiver means and the two portions of the secondary conduit means providing a return line circuit in hydraulic parallel to the primary water line.

2. A procedure for recovery of water which has been caused to flow through a geothermal energy means which is remotely downstream from primary water-treatment means of a primary water line, the primary water line having brought in water from an available water-supply source, the water possibly having contamination from the water-supply source and/or from the primary water line, the geothermal energy means using water from an outlet in the primary water line relatively close to the geothermal energy means, the geothermal energy means usage of the water possibly imparting contamination to the water, the improvement comprising the provision of the following in combination:

the provision of a terminal receiver means for removing contamination from the geothermal energy means usage of the water, the terminal receiver means being located remotely downstream from the primary water-treatment means of the primary water line, and relatively close to but downstream of the geothermal energy means, and causing the removal of said contamination by the terminal receiver means, and including the piping by secondary conduit means having a portion for carrying the water from the geothermal energy means to the terminal receiver means, and having a portion for carrying the water from the terminal receiver means to the primary water line at an inlet thereinto which is at a location therealong which is remotely downstream from the primary water-treatment means of the primary water line;

the terminal receiver means and the two portions of the secondary conduit means providing a return line circuit in hydraulic parallel to the primary water line.

* * * * *

UNITED STATES PATENT AND TRADEMARK OFFICE
CERTIFICATE OF CORRECTION

| | | |
|---|---|---|
| PATENT NO. | : | 6,053,239 |
| DATED | : | April 25, 2000 |
| INVENTOR(S) | : | James R. Hardin |

It is certified that error appears in the above-identified patent and that said Letters Patent is hereby corrected as shown below:

<u>Col. 6, line 57:</u>   "80," should be "so,".

Signed and Sealed this

Twentieth Day of March, 2001

Attest:

NICHOLAS P. GODICI

*Attesting Officer*    *Acting Director of the United States Patent and Trademark Office*